FREQUENCY DETECTION SYSTEM INCLUDING PARALLELED INVERSE CHARACTERISTIC PHASE SHIFTERS

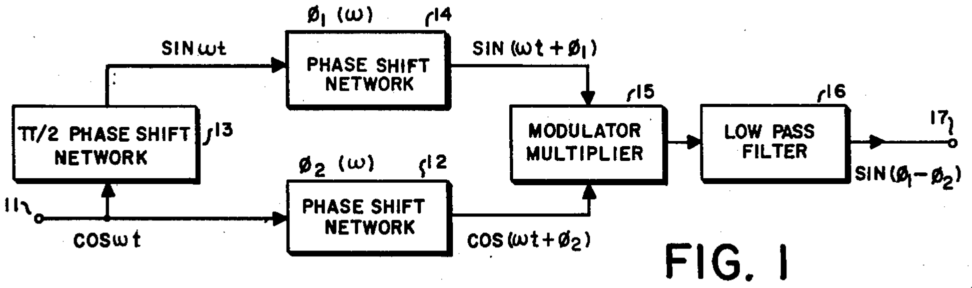
FIG. 1
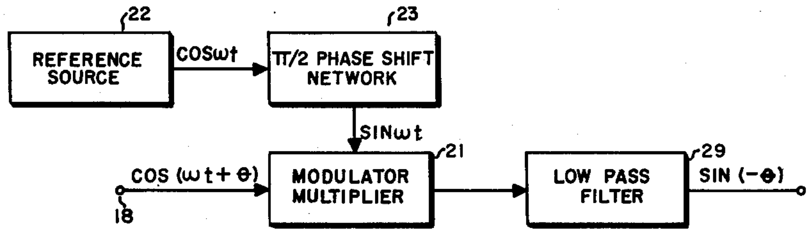
FIG. 2
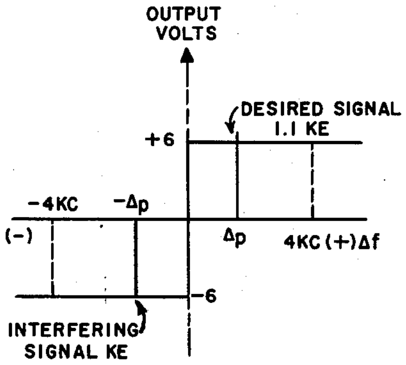
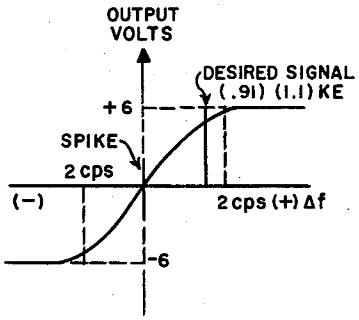
FIG. 4 FIG. 5
INVENTOR
MAURICE A. MEYER
BY Joseph Weingarten
ATTORNEY March 3, 1964 M. A. MEYER 3,123,769

Filed Oct. 26, 1954 4 Sheets-Sheet 2

INVENTOR
MAURICE A. MEYER

BY Joseph Weingarten
ATTORNEY

INVENTOR
MAURICE A. MEYER
BY Joseph Weingarten
ATTORNEY

INVENTOR
MAURICE A. MEYER
BY Joseph Weingarten
ATTORNEY

United States Patent Office 3,123,769

Patented Mar. 3, 1964

3,123,769

FREQUENCY DETECTION SYSTEM INCLUDING PARALLELED INVERSE CHARACTERISTIC PHASE SHIFTERS

Maurice A. Meyer, Natick, Mass., assignor to Laboratory for Electronics, Inc., Boston, Mass., a corporation of Delaware Filed Oct. 26, 1954, Ser. No. 464,697
1 Claim. (Cl. 324—82)

The present invention relates in general to frequency and phase discriminators and in particular to apparatus for detecting frequency and phase shifts over either a wide or a narrow frequency range merely by varying the phase shift characteristics of conventional active or passive networks. At the same time the discriminator disclosed in this invention captures a desired signal just slightly greater in amplitude than an undesired one, even when operating as a narrow band discriminator. A further advantage of this invention is that an oscillator whose frequency is controlled by this invention can be made to phase lock on the incoming frequency despite the presence of noise. The locked-in oscillator then provides a substantially noise-free replica of the incoming frequency.

Fundamentally a frequency discriminator is a device which indicates a deviation in frequency from a reference frequency; or a deviation in phase from a reference phase, in a phase discriminator.

Conventional techniques utilize coupled tuned circuits so arranged that when the signal frequency is the same as that of the reference frequency, zero D.-C. voltage appears at the output of the discriminator. A shift in frequency results in an increase in the magnitude of this D.-C. voltage, its sign being indicative of whether the shift was above or below the reference frequency. While the conventional circuits are inexpensive and work well for ordinary FM detection and AFC uses, when the magnitude of the frequency shift is small, the output of conventional discriminators is insufficient to indicate the sense or magnitude of such a small shift. Furthermore, in applications where it is important to know the sense of a large frequency shift relative to the reference frequency, a conventional discriminator fails because the nature of its S curve is such that its output voltage as a function of frequency rapidly returns to zero at great deviations from center frequency. In addition, a conventional discriminator, when utilized for narrow band operation, has a poor capture ratio, and cross talk from spurious signals having a frequency near that of the desired signal is not uncommon. Finally, its stability is limited by the accuracy to which its center frequency may be maintained.

The present invention contemplates as a primary objective the indication of both the sense and the magnitude of a relatively small deviation of a signal frequency from a reference frequency while at the same time indicating sense of relatively large deviations of the signal frequency from the reference frequency.

Another objective is to measurably improve the capture ratio of discriminators, especially when used as a narrow band discriminator.

A further objective of this invention is to provide an output for controlling the frequency of an oscillator such that this controlled oscillator may phase lock at the frequency of an input signal.

Still another objective is to indicate the sense and magnitude of the phase angle between a signal frequency and a reference frequency, both of the same frequency with the same apparatus capable of frequency discrimination.

These and other objectives and advantages of the present invention will become apparent from the following specification with reference to the accompanying drawing in which:

FIG. 1 is a simplified block diagram to illustrate the essence of the invention with respect to frequency discrimination;

FIG. 2 is a simplified block diagram to illustrate the essence of the invention with respect to phase discrimination;

FIG. 4 is a discriminator curve of the preferred embodiment;

FIG. 5 is a discriminator curve of the preferred embodiment on an expanded time scale for illustrating the improved capture ratio of the invention, even when utilized as a narrow-band discriminator;

Figure 7:
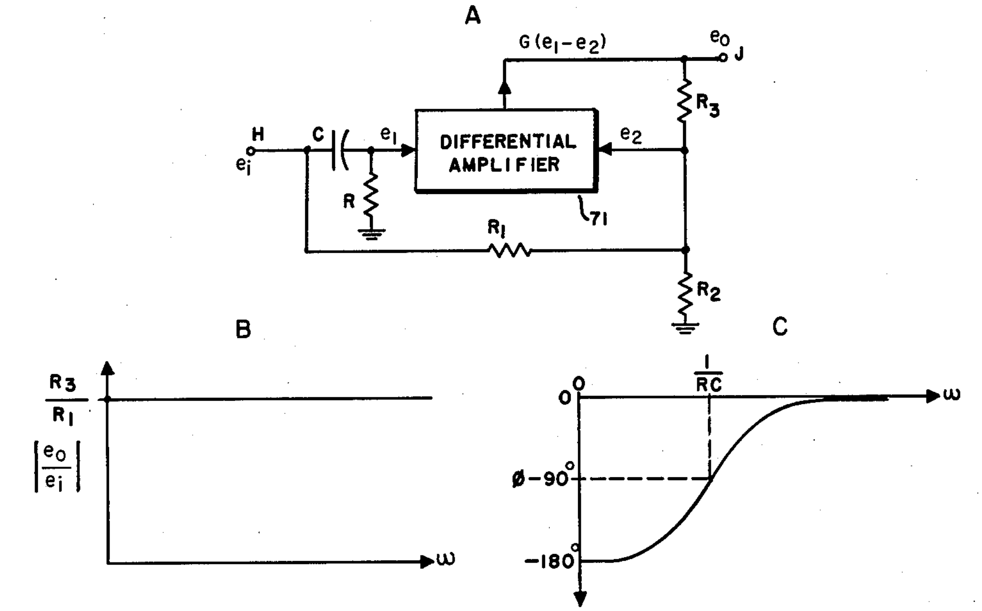
Figure 8:
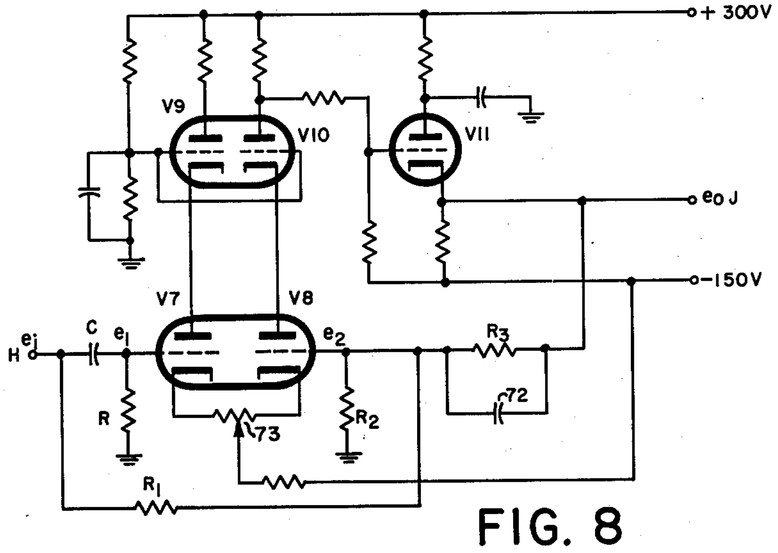

FIG. 7*a* is a partial schematic circuit diagram of a preferred form of the phase-shift networks utilized in the preferred embodiment;

FIG. 7*b* and FIG. 7*c* illustrate the amplitude and phase characteristics of the circuit of FIG. 7*a*;

FIG. 8 is a complete schematic circuit diagram of the circuit of FIG. 7*a*; and

Figure 9:
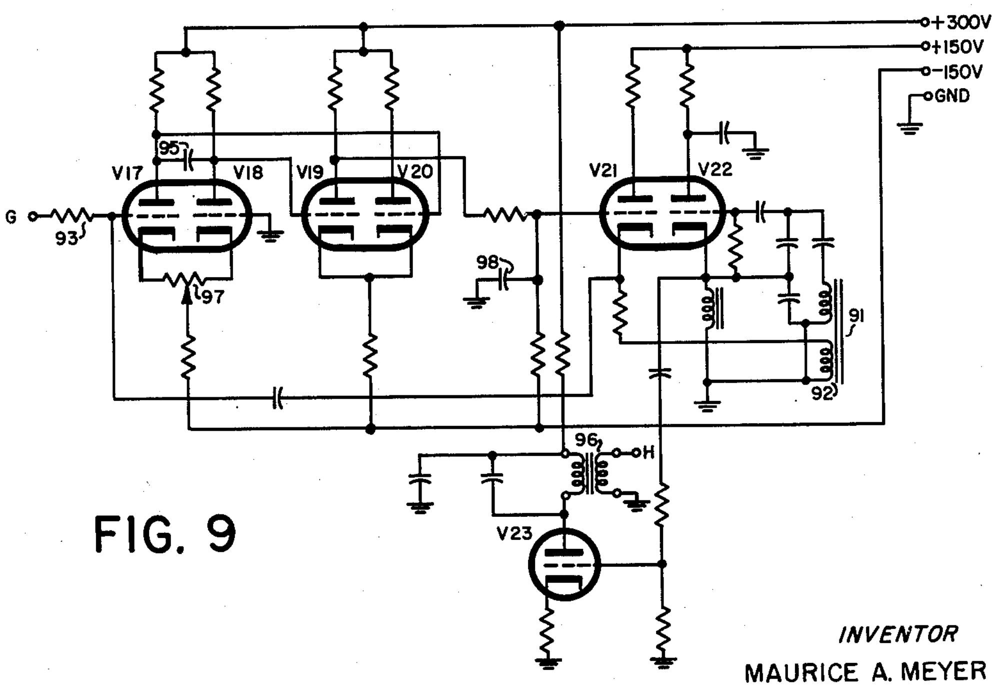

FIG. 9 is a schematic circuit diagram of a preferred form of the oscillator-integrator shown in the preferred embodiment.

In the discussion which follows frequent use is made of the well-known trigonometric relations:

$$\sin A \sin B = \tfrac{1}{2} \cos (A-B) - \tfrac{1}{2} \cos (A+B),$$
$$\cos A \cos B = \tfrac{1}{2} \cos (A-B) + \tfrac{1}{2} \cos (A+B), \text{ and}$$
$$\sin A \cos B = \tfrac{1}{2} \sin (A+B) + \tfrac{1}{2} \sin (A-B).$$

However, because only the angular frequencies will be of interest in the ensuing discussion, for simplicity the coefficients of the various items will be considered as unity.

Referring now to FIG. 1, a sinusoid, $\cos \omega t$, is applied to the input 11. It passes through phase-shift network 12 thus receiving a phase shift, $\phi_2$, dependent on its frequency, $\omega$, to become $\cos (\omega t + \phi_2)$. The sinusoid $\cos \omega t$ at the input 11 also passes through the $\pi/2$ phase-shift network 13 and becomes $\sin \omega t$, in quadrature to $\cos \omega t$ at input 11. Upon entering phase-shift network 14 $\sin \omega t$ receives a phase shift, $\phi_1$, dependent on its frequency, $\omega$, and becomes $\sin (\omega t + \phi_1)$. The outputs of phase-shift network 14 and phase-shift network 12 are multiplied together in the modulator multiplier 15 yielding a product containing an A.-C. term $\sin (2\omega t + \phi_1 + \phi_2)$ which is filtered out by the low-pass filter 16, and a D.-C. term, $\sin (\phi_1 - \phi_2)$, which is a function of the frequency $\omega$ because of the nature of phase-shift networks 14 and 12.

Note that only one phase-shift network is in fact needed to learn the frequency $\omega$, but examine the advantages of using two phase-shift networks. By making $$\phi_1(\omega) = -\phi_2(\omega)$$

$\phi_1 = -\phi_2$ and a D.-C. term at the output 17, $\sin 2\phi_1$, is detected instead of $\sin \phi_1$ which would be the output if $\phi_2$ were equal to zero. (Phase-shift network 12 was eliminated.) This yields a higher output if $0 < \phi_1 < 45°$. Two phase shifters permit greater flexibility in designing the desired shape of discriminator curve. By proper design of the phase-shift networks, any desired discriminator curve may be obtained. For example, it would be relatively simple to have a phase-shift network 14 which had a 90° phase shift at a low frequency, decreased to a 45° phase shift at some frequency, $\omega_0$, and decreased to 0° at higher frequencies. A phase-shift network 12 could easily have 0° phase shift at a low frequency, increase to 45° at the aforementioned frequency, $\omega_0$, and rise to 90° at higher frequencies. Then sin $(\phi_1-\phi_2)$ would be 1 at the low frequency, 0 at $\omega_0$ and go to $-1$ at higher frequencies. Note that a discriminator curve resulting from such phase-shift networks would yield a definite indication of the sense of the frequency shift far from $\omega_0$.

As another example of the utility of this invention consider the Bode optimum attenuation function, as explained in the Bell System Technical Journal, 1940, page 430. It is well known that it is possible to specify either the attenuation characteristics or the phase characteristics of a passive driving point impedance or admittance over a given frequency range. In the Bode optimum the attenuation characteristic is specified as flat below a frequency, $\omega_0$, and as a consequence the phase characteristic turns out to be proportional to the sin $-1\omega/\omega_0$. Such a phase-shift network used in this system would then yield for a constant amplitude input voltage a constant output voltage for frequencies below $\omega_0$ but shifted in phase by K sin $-1\omega/\omega_0$. If $K=1$, $\phi=\sin -1\omega/\omega_0$, and sin $\phi=\omega/\omega_0$, appears at the output of the discriminator and is a linear function of frequency, thus providing a perfectly linear discriminator over the frequency range below $\omega_0$.

Referring now to FIG. 2, the utilization of this invention for phase detection is illustrated. A sinusoid, cos $(\omega t+\theta)$, enters at one input 18 to the modulator multiplier 21. A reference signal generator 22 generates a sinusoid, cos $\omega t$, which passes through the phase-shift network 23 and emerges as sin $\omega t$. The output, sin $\omega t$, of the phase-shift network 23 is multiplied by cos $(\omega t+\theta)$ in the modulator multiplier 21 to yield a D.-C. term, sin $(-\theta)$ and an A.-C. term, sin $(2\omega t+\theta)$, which is filtered out by low-pass filter 29. By measuring this D.-C. output and noting its polarity, the sense of the phase shift is unambiguously indicated.

Figure 3:
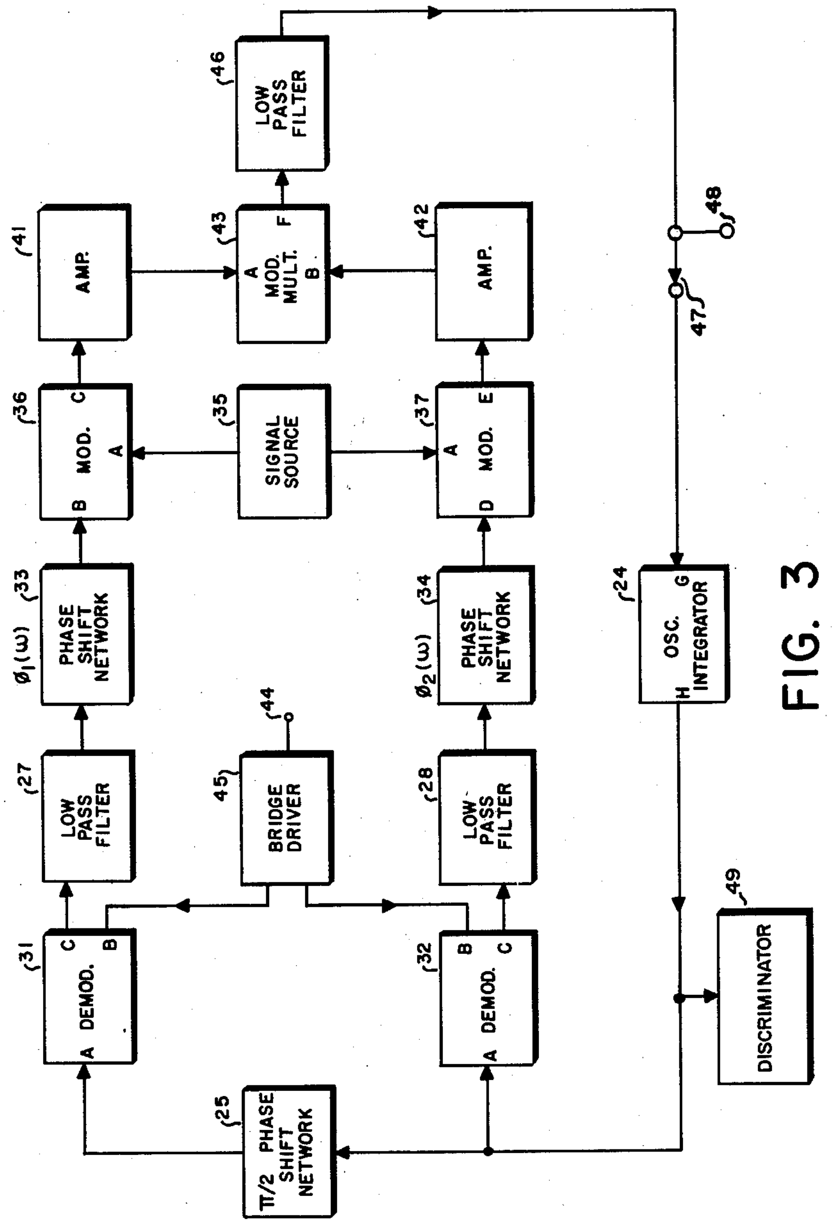
FIG. 3 is a block diagram of a preferred embodiment of the invention.

Referring now to FIG. 3, the preferred embodiment of the invention is shown in block diagram form. First consider the input at terminal 44 to be cos $pt$ and see how the frequency output of the oscillator-integrator 24 is maintained at $p$. Assume that the output of the oscillator-integrator 24 is cos $(p+\Delta p)t$ where $\Delta p$ is a slight difference in frequency from $p$ and may be positive or negative. This output passes through the $\pi/2$, phase-shift network 25 and becomes sin $(p+\Delta p)t$. The bridge driver 45 provides a signal cos $pt$ into demodulators 31 and 32. The output sin $(p+\Delta p)t$ of phase-shift network 25 beats with cos $pt$ to form a modulation product whereby only the difference frequency is preserved and $\pm$sin $\Delta pt$ appears at the output of the demodulator 31 along with higher frequency terms which are filtered out by low-pass filter 27. The sign of sin $\Delta pt$ is positive if $\Delta p$ is positive; negative if $\Delta p$ is negative.

The output cos $(p+\Delta p)t$ of the oscillator-integrator 24 is combined with the output cos $pt$ of bridge driver 44 in demodulator 32 to form a modulation product whereby only the difference frequency is preserved after passing through low-pass filter 28, yielding, cos $\Delta pt$, irrespective of the sign of $\Delta p$. The output $\pm$sin$\Delta pt$ of low-pass filter 27 passes through phase-shift network 33 producing a phase-shift $\phi_1$ which is a function of $|\Delta p|$ so that the output of phase-shift network 33 is $\pm$sin $(\Delta pt+\phi_1)$. The output cos $\Delta pt$ of low-pass filter 28 passes through phase-shift network 34 producing a phase shift $\phi_2$ which is a function of $|\Delta p|$. Thus the output of phase-shift network 34 is cos $(\Delta pt+\phi_2)$.

The outputs of the phase shifters 33 and 34 modulate the signal cos $rt$ from a signal generator 35 and modulators 36 and 37 respectively to translate the phase information carrying signals to a convenient frequency for amplification by amplifiers 41 and 42 respectively. The output $\pm$sin $(rt+\Delta pt+\phi_1)\pm$sin $(rt-\Delta pt-\phi_1)$ of amplifier 41 is multiplied by the output cos $(rt+\Delta pt+\phi_2)+$ cos $(rt-\Delta pt-\phi_2)$ of amplifier 42 in modulator multiplier 43 which yields $\pm$sin $(\phi_1-\phi_2)$ as the D.-C. term of the product which, after filtering out the A.-C. terms in low-pass filter 46, is used to control the frequency output of oscillator-integrator 24. If $\phi_1(0)$ equals $\phi_2(0)$, then when $\Delta p$ equals zero, the oscillator-integrator receives zero D.-C. control voltage and continues to emit a frequency $p$. Any drift in frequency from $p$ will cause a control voltage to appear at the output of the modulator multiplier tending to restore the output frequency of oscillator-integrator 24 to $p$.

Now consider the case where the output of the oscillator-integrator 24 is cos $(pt+\Delta pt+\theta)$. Then the output of modulator multiplier 43 still contains the term $\pm$sin $(\phi_1-\phi_2)$. An A.-C. term of the product will be $\pm$sin $(2\Delta pt+\phi_1+\phi_2+2\theta)$. If $\Delta p$ goes to zero and $$\phi_1(0)=\phi_2(0)$$

then $\pm$sin $(\phi_1-\phi_2)$ goes to zero while the A.-C. term sin $(2\Delta pt+\phi_1+\phi_2+2\theta)$ of the product goes to a D.-C. term, sin $(2\phi(0)+2\theta)$. This term will be passed through the system when D.-C. coupling is used between stages.

This D.-C. voltage, sin $[2\phi(0)+\theta]$ is fed to the oscillator-integrator 42 as a control voltage for locking the phase of the output of oscillator-integrator 24 with the phase of the input signal on terminal 44. When $$-\theta=\phi(0)$$

the control signal fed back to the oscillator-integrator 24 is zero and so its output tends to lock in with the phase equal to $-\phi(0)$. A measurement of the control signal will indicated the sense and magnitude of $\theta$.

Now consider a sinusoid cos $(p+\Delta p)t$ where $\Delta p$ is a positive or negative frequency difference from $p$ inserted at the input 44 of the bridge driver 45. By the procedure discussed above, the oscillator will tend to lock on the new frequency $p+\Delta p$ and will require a different D.-C. control signal. By noting the sense and magnitude of the shift in the control signal, both the magnitude and sense of $\Delta p$ may be determined.

In a stable system, of course, this D.-C. control signal settles at some non-zero value indicative of the phase angle $\theta$. By measuring this D.-C. signal and noting its polarity, it is possible to get an indication of the frequency difference $\Delta p$ and whether the difference is positive or negative.

FIG. 4 is a plot of the D.-C. voltage output of low-pass filter 46 following modulator multiplier 43 as a function of frequency difference, $\Delta p$, entering at 44 in FIG. 3. The phase-shift networks 33 and 34 are chosen so that for $|\Delta p|>0$, $\phi_1-\phi_2$ is subsstantially $\pi/2$, radians. This choice is made for two reasons; first, because sin $(\phi_1-\phi_2)$ is a maximum for this value; and second, $$\frac{\partial}{\partial(\phi_1-\phi_2)}\sin(\phi_1-\phi_2)=\cos(\phi_1-\phi_2)$$

is a minimum for this value. Hence, slight variations of $(\phi_1-\phi_2)$ as a function of frequency about $\pi/2$ causes negligible change in the value of sin $(\phi_1-\phi_2)$ so that the discriminator curve in FIG. 4 is substantially flat on either side of the vertical axis as shown. The advantages derived from this discriminator characteristic are discussed later. One the scale shown, it is not possible to detect the width of the region where the output voltage shifts polarity. Actual measurements indicate this region to be 3 to 4 cycles per second wide. Since the slope through the origin is of the order of 4 volts per cycle per second, little difficulty is encountered in detecting a shift of 0.1 cycles and whether it is above or below the reference frequency. The spike which occurs at zero frequency is not visible in this plot because of the large frequency scale. Measurements indicate that this spike locks the frequency of the oscillator-integrator to the input frequency.

To utilize the invention for the detection of ordinary narrow or wide band frequency modulated signals, it is merely necessary to apply the signal to be detected to terminal 44 and remove the integration network from oscillator-integrator 24. The oscillator 24 will then be pulled by the D.-C. output of low-pass filter 46 until it locks in with the signal to be detected. The control signal necessary to pull the oscillator to the frequency to be detected is an indication of this frequency. If this frequency varies in accordance with some modulating waveform, the control voltage will vary in accordance with this modulating waveform. It is, of course, possible to A.-C. couple modulator multiplier 43 to low-pass filter 46 if the spike shown in FIG. 5 is not desired. This would be desirable if oscillator 24 was a fixed frequency source and the output of low-pass filter 46 was used as an input to an audio amplifier.

To illustrate the way the present invention discriminates between a desired signal only slightly greater in amplitude than an undesired signal, refer to the discriminator curves in FIG. 4 and FIG. 5. FIG. 5 shows the curve of FIG. 4 near the origin on an expanded frequency scale. Assume a desired signal of amplitude 1.1 $E_0$ at a frequency $\Delta p$ above $p$, the instantaneous frequency of oscillator 24. Assume an undesired signal of amplitude $E_0$, $\Delta p$ below $p$. The instantaneous D.-C. control voltage at the output of low-pass filter 46 is then proportional to $1.1\,E_0-E_0$ or $0.1\,E_0$ and is positive. This will cause oscillator 24 to be pulled in frequency toward the desired signal $\Delta p$ above $p$. As oscillator 24 is pulled to $p+\Delta p$ the D.-C. output of the low-pass filter from the undesired signal continues to be unchanged in magnitude or polarity while the D.-C. output from low-pass filter 46 due to the desired signal is reduced as the difference between the desired signal frequency and oscillator 24 frequency becomes small. This small frequency difference rides on the portion of the discriminator curve which has a positive slope. When this frequency difference is such that the D.-C. output from the desired signal has been reduced from being proportional to 1.1 $E_0$ to being proportional to $E_0$, then the total D.-C. control voltage from low-pass filter 46 goes to zero, and the oscillator 24 tends to stabilize its frequency so that this small frequency difference exists. Note that the nature of the discriminator curve in FIG. 5 is such that oscillator 24 will lock in frequency to within just 2 cycles of the desired frequency, although the desired frequency might be many megacycles.

Figure 6:
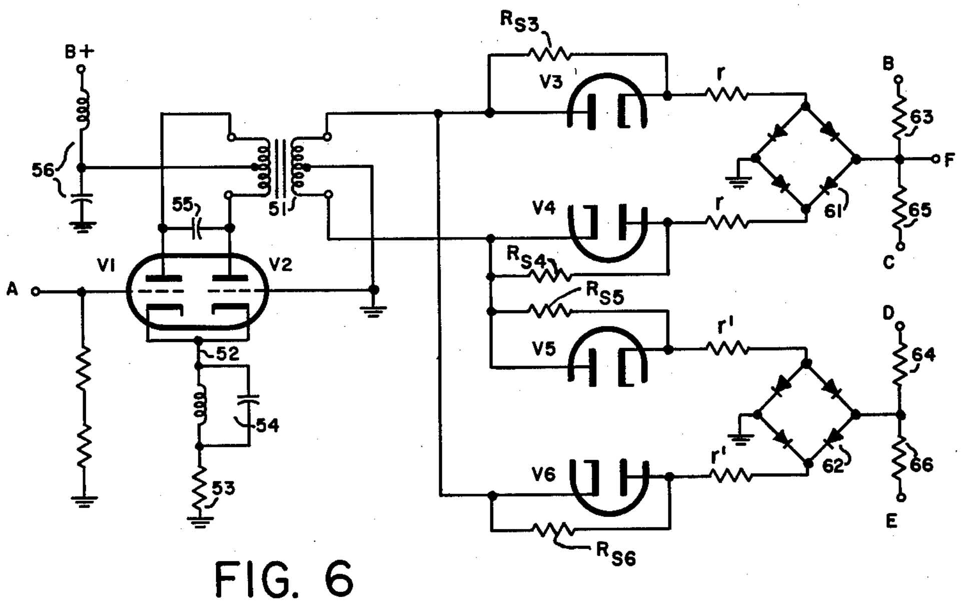
FIG. 6 is a schematic circuit diagram of a preferred form of the modulators, demodulators and modulator multiplier used in the preferred embodiment.

FIG. 6 is a schematic diagram of a double balanced modulator which is the preferred embodiment of demodulators 31 and 32, modulators 36 and 37, and modulator multiplier 43 with slight variations in circuit parameter values and terminal connections dependent upon the particular application of the circuit. The lettered terminals in FIG. 6 correspond to the lettered terminals in FIG. 3. Note that only one-half of the double balanced modulator is required in both demodulators 31 and 32 and in modulator multiplier 43.

Referring now to FIG. 6, electron tube triode sections V1 and V2 take the unbalanced input at A and convert it to a balanced input for application to transformer 51. A rise in potential on the grid of V1 causes a drop in potential on the plate of V1 and a rise in potential at the junction 52 of the cathodes of V1 and V2. Because the grid of V2 is tied to ground, the rise in potential at 52 causes a decrease of plate current flow in V2 which causes the potential on V2 to rise. Thus as the potential on the plate of V1 falls, the potential on the plate of V2 rises and transformer 51 is driven by a balanced source. Resistor 53 is a D.-C. bias resistor and tuned-circuit 54 provides a high impedance at the frequency of the input signal applied at A. Capacitor 55 tunes the primary impedance of transformer 51 so that the combined impedance is resonant at the frequency of the input at A. Inductor-capacitor network 56 is a decoupling network.

The output of transformer 51 is applied to the bridge 61 through the two resistors $r$, and V3 and V4 shunted by $R_{S3}$ and $R_{S4}$ respectively. In a similar manner the output of transformer 51 is applied to bridge 62 through the two resistors $r'$, and diodes V5 and V6 shunted by $R_{S5}$ and $R_{S6}$ respectively. Note that when the output of transformer 51 is of a polarity such that diodes V3 and V4 conduct, bridge 61 is switched on, diodes V5 and V6 do not conduct, and bridge 62 is switched off. On the next half-cycle, diodes V3 and V4 do not conduct, bridge 61 is switched off, diodes V5 and V6 conduct, and bridge 62 is switched on.

The resistors $r$ and $r'$ permit a higher switching potential to be applied to the bridges than would be possible if these resistors were absent. Their utility is thoroughly described in co-pending application, Serial No. 337,742 of Bernard M. Gordon and Maurice A. Meyer entitled "Balanced Modulator" now U.S. Patent No. 2,799,829.

The resistors $R_{S3}$, $R_{S4}$, $R_{S5}$, and $R_{S6}$ are large compared to $r$ and $r'$ and permit a portion of the back cycle to be applied to the bridges to switch them off rapidly, thereby improving linearity and efficiency. Their utility is discussed in co-pending application Serial No. 459,646 of Maurice A. Meyer entitled "Balanced Modulator" now U.S. Patent No. 2,962,675.

Inputs are applied at B and D through resistors 63 and 64 respectively and outputs taken at C, D, and E through resistors 65 and 66 respectively. Spectral analysis shows that the output at C will contain the sum and difference frequencies of the input at A and the input at B. Similarly, the output at E will contain sum and difference frequencies of the input at A and the input at D.

It should now be clear that in FIG. 3 the output of the signal source 35 may be applied to terminal A and the outputs of phase-shift networks 33 and 34 applied to terminals B and D respectively while the outputs at C and E may be applied to amplifiers 41 and 42 respectively.

In demodulators 31 and 32 either the output of oscillator-integrator 24 or its output shifted in phase by $\pi/2$, radians is applied to input A, the output of bridge driver 45 is applied to terminal B, and the demodulated output taken at C. Bridge 62 and the components associated with it are not required for the demodulators 31 and 32.

Modulator multiplier 43 of FIG. 3 is excited by amplifier 41 at input A and amplifier 42 at input B. The output is taken from terminal F. Once again bridge 62 and its associated components are not required for this application.

Referring now to FIG. 7, a schematic diagram shows the basic principles of the novel all-pass phase-shift networks which are the preferred form of phase-shift networks 33 and 34 of FIG. 3. In the following discussion it will be shown that the complex voltage ratio $e_o/e_i$ has an amplitude characteristic independent of frequency, shown in FIG. 7B, and the phase-shift characteristic as a function of frequency of FIG. 7C.

To simplify the analysis of the circuit, capacitor C will be considered zero at first and the principle of superposition applied, first finding the output $e_0$ at terminal J for $e_1=0$, $e_i=e_i$; and then, $e_1=e_1$, $e_i=0$.

From an examination of FIG. 7A, $e_2$, the second input to the differential amplifier may be expressed:

$$e_2=\frac{\frac{R_2R_3}{R_2+R_3}e_i}{\frac{R_2R_3}{R_2+R_3}+R_1}-\frac{Ge_2\frac{R_1R_2}{R_1+R_2}}{\frac{R_1R_2}{R_1+R_2}+R_3}$$

$$e_2\left[1+\frac{\frac{GR_1R_2}{R_1+R_2}}{\frac{R_1R_2}{R_1+R_2}+R_3}\right]=e\frac{R_2R_3}{R_2R_3+R_1R_2+R_1R_3}$$

where G is the gain of the differential amplifier.

$$e_2(R_1R_2+R_1R_3+GR_1R_2)=e_iR_2R_3-e_2R_2R_3$$

$$e_2=\frac{R_2R_3e_i}{(1+G)R_1R_2+R_1R_3+R_2R_3}$$

The output is $$-Ge_2=\frac{-Ge_iR_2R_3}{(1+G)R_1R_2+R_1R_3+R_2R_3}$$

Now if $R_1 \approx R_2$ and $GR_1>>R_3$, then the output $$e_{01}\approx -e_i\frac{R_3}{R_1}$$

where $e_{01}$ is the output for the first case.

For the second case $e_i=0$, $e_1=e_1$ and $R_1$ is in parallel with $R_2$ then:

$$e_2=\frac{\frac{R_1R_2}{R_1+R_2}G(e_1-e_2)}{\frac{R_1R_2}{R_1+R_2}+R_3}=\frac{R_1R_2G(e_1-e_2)}{R_1R_2+R_1R_3+R_2R_3} \text{ or}$$

$$e_2[R_1R_2(1+G)+R_1R_3+R_2R_3]=Ge_1R_1R_2 \text{ or}$$

$$e_2=\frac{Ge_1R_1R_2}{(R_1R_2)(1+G)+R_1R_3+R_2R_3}$$

$$e_{02}=G(e_1-e_2)=Ge_1\left[\frac{R_1R_2+R_1R_3+R_2R_3}{R_1R_2(1+G)+R_1R_3+R_2R_3}\right]$$

where $e_{02}$ is the output for the second case. Using the same approximations as before when $R_1 \approx R_2$ and $GR_1>>R_3$ $$e_{02}\approx e_1\left[1+R_3\left(\frac{R_1+R_2}{R_1R_2}\right)\right]\approx\frac{\frac{R_1R_2}{R_1+R_2}+R_3}{\frac{R_1R_2}{R_1+R_2}}e_1$$

if $$\frac{\frac{R_1R_2}{R_1+R_2}+R_3}{\frac{R_1R_2}{R_1+R_2}}=2\frac{R_3}{R_1}$$

the combined output $$e_{01}+e_{02}=e_0\approx(2e_1-e_i)\frac{R_3}{R_1}$$

This requires:

$$1+R_3\frac{R_1+R_2}{R_1R_2}=2\frac{R_3}{R_1} \text{ or } 1=\left(2-\frac{R_1+R_2}{R_2}\right)\frac{R_3}{R_1}$$

or calling $R_3/R_1$ the all-pass gain H $$\frac{R_2-R_1}{R_2}=\frac{1}{H};\ R_2=\frac{H}{H-1}R_1$$

Now if terminal H is driven from a low-impedance source $$e_i=e_i \text{ and } e_1=\frac{Re_i}{R+\frac{1}{j\omega C}}=\frac{j\omega e_i}{j\omega+\frac{1}{RC}}$$

$$e_0=\left(\frac{2j\omega e_i}{j\omega+\frac{1}{RC}}-e_i\right)H=He_i\frac{j\omega-\frac{1}{RC}}{j\omega+\frac{1}{RC}}$$

and $$\frac{e_0}{e_i}=H\frac{j\omega-\frac{1}{RC}}{j\omega+\frac{1}{RC}}$$

yielding the all-pass characteristic shown in FIG. 7B and FIG. 7C.

If instead of C we substitute an arbitrary impedance, $Z_1(j\omega)$, and instead of R use a $Z_2(j\omega)$, then:

$$e_1=\frac{Z_2(j\omega)e_i}{Z_1(j\omega)+Z_2(j\omega)} \text{ and } \frac{e_0}{e_i}=H\frac{Z_2(j\omega)-Z_1(j\omega)}{Z_2(j\omega)+Z_1(j\omega)}$$

This permits an all-pass characteristic to be obtained with the circuit herein disclosed provided $Z_2$ and $Z_1$ are properly chosen. For a description of a procedure for properly choosing these impedances; reference is made to a paper entitled "Design of RC Wide-band 90-Degree Phase-Difference Network" by D. K. Weaver, appearing in the "Proceedings of the I.R.E.", April 1954.

The preceding discussion of FIG. 7 should facilitate the understanding of the corresponding schematic circuit diagram shown in FIG. 8 to which the reference symbols of FIG. 7 are carried over.

Referring now to FIG. 8, it is apparent from FIG. 7*c* that resistor R and capacitor C control the shape of the phase-shift characteristic. Hence, phase-shift networks 33 and 34 of the preferred embodiment of FIG. 3 differ from the schematic in FIG. 8 only in the values of resistor R and capacitor C.

Difference amplifier 71 comprises V7, V8, V9, V10, and V11. V10 and V9 act as plate load resistors for V7 and V8 to help maintain stable D.-C. amplification. V11 is a cathode follower which permits the output at terminal J to be taken at low impedance. Capacitor 72 provides an alternating current negative feedback path for gain stabilization and reduction of distortion. Potentiometer 73 balances the amplifier and is adjusted so that $e_0=0$, when $e_i=0$.

Thus the phase-shift amplifier herein disclosed provides the characteristics of an all-pass network with a highly stabilized gain down to D.-C.

While this particular embodiment of the phase-shift networks 33 and 34 has been chosen to obtain the discriminator curve of FIG. 4, it is clear that one could choose any form of phase-shift network active or passive, the form being dependent only on the type of discriminator curve desired. The resistor R may be made a variable resistance to permit adjustment of the phase-shift characteristic and consequently the discriminator curve.

Referring now to FIG. 9 a schematic circuit diagram of oscillator-integrator 24 of FIG. 3 is shown in one specific form. As mentioned before the only purpose of the integrator section of oscillator-integrator 24 is to improve the performance of the system when detecting relatively slow variations of input frequency in the presence of noise. Clearly, the oscillator could be controlled directly from the output of low-pass filter 46.

In the circuit disclosed herein tubes V17–V21 constitute a D.-C. amplifier utilizing Miller integration and adjusted for balance with balancing potentiometer 97. Capacitor 98 prevents the amplifier from oscillating. V22 is utilized in a conventional Clapp oscillator circuit whose frequency is controlled by the inductance of inductor 91 whose inductance is controlled by the current of V21 flowing through control winding 92 of inductor 91.

The D.-C. voltage output of low-pass filter 46 of FIG. 3 is applied to terminal G which is coupled to the grid of V17 through resistor 93. Amplification of the D.-C. is conventional and the amplified D.-C. appears on the grid of V21. Variations of the potential on the grid of V21 cause corresponding variations in its plate current which flows through control winding 92 of inductor 21, varying its inductance and the frequency of the oscillator.

Noise reduction is accomplished in two ways, the first of which utilizes an integrating network composed of resistor 93 and the input capacity seen at the grid of V17. Because of the well-known Miller effect, the input capacity seen at the grid of V17 is essentially capacitor 94 multiplied by the overall gain of the D.-C. amplifier comprising tubes V17 through V21. The second method utilizes the differential amplifier comprising V17 and V18. A noise pulse on the grid of V17 appears on its plate as a pulse of opposite polarity and on the plate of V18 as a pulse of the same polarity. Circuit parameters are chosen so that both pulses are of equal amplitude. The pulse on the plate of V17 is then coupled to the plate of V18 by capacitor 95. The two pulses, by virtue of their opposite polarities and substantially equal magnitudes, yield substantially zero output on the plate of V18.

Because the particular embodiment described herein is utilized to detect relatively small variations in frequency at a relatively slow rate of change about a center frequency, it is desirable to limit the frequency range whereover the oscillator may vary. This is accomplished by V21 cutting off with its grid at a particular negative potential with respect to its cathode and by V21 drawing grid current when its grid is at a positive potential with respect to cathode.

V23 is a conventional gain-stabilized triode amplifier fed from the cathode of oscillator tube V22. The plate load of V23 is tuned to the oscillator center frequency and the output of the oscillator-integrator is taken through transformer 96 at terminal H.

In the particular embodiment of the invention described herein, the discriminator has been shown in a form whereby a variable frequency oscillator is controlled so that it tracks an input frequency although the signal-to-noise ratio of the input may be very low. By reading the current through the control winding 92 of the current-controlled inductor 91, substantially the exact frequency of the oscillator and consequently substantially the exact frequency of the input signal may be determined to a degree heretofore unobtainable with conventional discriminators.

By opening switch 47 and replacing oscillator-integrator 24 with a fixed-frequency oscillator tuned to roughly the center frequency of the input, then an output voltage as a function of frequency difference shown in FIG. 4 will appear at terminal 48. The frequency difference will be that between the instantaneous input frequency and the fixed oscillator frequency.

Note that the constant-amplitude noise-free output of the locked oscillator may be applied to a conventional discriminator, in which case, the output of the latter circuit would consist of a potential which varies in accordance with the frequency changes of the locked oscillator. This arrangement will then yield the desired conventional discriminator type output relatively free of noise. As an alternative, the output of oscillator-integrator 24 may be coupled to the input 44 of a second discriminator, generally as shown in FIG. 3 with switch 47 open as described above, with the final output taken at terminal 48 in the second circuit.

Such a system will detect a desired signal of an amplitude only slightly greater than undesired signals and be virtually insensitive to noise and amplitude variations. The insensitivity to amplitude variations occurs because the locked oscillator locks on the incoming frequency regardless of amplitude. Noise rejection is obtained in a manner somewhat similar to the method of capturing a desired signal described previously. It is most probable that the average value of the frequency components of noise above the signal frequency equals the average value of the components of noise below the signal frequency; hence, the resultant control signal from noise components tending to pull the locked oscillator is substantially zero.

The invention need not be limited to the particular form herein shown. By virtue of the great flexibility with which phase shift network 33 and 34 may be designed, any arbitrary discriminator curve may be obtained by proper design of the phase-shift network.

The advantages of this invention in frequency control and measurements are apparent, but its utility in any application requiring accurate indications of small frequency or phase changes should not be overlooked. Nor should one neglect noting the ease with which discriminator curves of arbitrary shapes may be designed.

It is apparent that one skilled in the electrical art may make numerous departures from and modifications of this example described in a particular form. Consequently, the invention herein is to be construed as limited only by the spirit and scope of the appended claims.

What is claimed is:

Apparatus for detecting the frequency of an input signal comprising, a variable frequency signal source, means for shifting the phase of said variable frequency signal by substantially $$\frac{\pi}{2}$$

radians, means for multiplying said input signal by said phase-shifted variable frequency signal to provide a first product signal, means for multiplying said input signal by said variable frequency signal to form a second product signal, first and second phase shift means having inverse phase-shift characteristics as a function of frequency for shifting the phase of said first and second product signals respectively, a source of a fixed frequency signal, means for modulating said fixed frequency signal by the first and second phase-shifted product signals to form first and second modulation product signals respectively, means for multiplying together said first and second modulation product signals to provide a final product signal, means for controlling the frequency of said source of a variable frequency signal by said final product signal such that the difference between the frequency of said input signal and said variable frequency signal is minimized, and means for indicating the frequency of said variable frequency signal.

References Cited in the file of this patent

UNITED STATES PATENTS

| | | |
|---|---|---|
| 2,304,134 | Wirkler | Dec. 8, 1942 |
| 2,434,914 | Earp | Jan. 27, 1948 |
| 2,480,128 | Frum | Aug. 30, 1949 |
| 2,481,659 | Guanella | Sept. 13, 1949 |
| 2,522,371 | Guanella | Sept. 12, 1950 |
| 2,558,758 | Jaynes | July 3, 1951 |
| 2,566,876 | Dome | Sept. 4, 1951 |
| 2,580,803 | Logan | Jan. 1, 1952 |
| 2,585,532 | Briggs | Feb. 12, 1952 |

FOREIGN PATENTS

| | | |
|---|---|---|
| 472,643 | Canada | Apr. 3, 1951 |
| 583,794 | Great Britain | Dec. 31, 1946 |
| 706,298 | Great Britain | Mar. 24, 1954 |